United States Patent [19]

Dover, Jr.

[11] 4,353,803

[45] * Oct. 12, 1982

[54] LAND RESTORATION FOLLOWING OIL-WELL DRILLING AND PRODUCTS USEFUL THEREFOR

[76] Inventor: Virgil L. Dover, Jr., 501 Marie Antoinette St., Lafayette, La. 70506

[ * ] Notice: The portion of the term of this patent subsequent to Nov. 18, 1997, has been disclaimed.

[21] Appl. No.: 205,098

[22] Filed: Nov. 10, 1980

Related U.S. Application Data

[63] Continuation-in-part of Ser. No. 17,558, Mar. 5, 1979, Pat. No. 4,234,421.

[51] Int. Cl.³ .............................................. C02F 1/56
[52] U.S. Cl. .................................. 210/728; 210/721; 252/181; 175/66
[58] Field of Search ................... 175/66; 210/620, 631, 210/702, 708, 716, 717, 721, 723–728, 734, 738; 252/8.5 A–8.5 C, 180, 181

[56] References Cited

U.S. PATENT DOCUMENTS

| | | | |
|---|---|---|---|
| 3,066,095 | 11/1962 | Hronas | 210/728 |
| 3,130,167 | 4/1964 | Green | 252/181 |
| 3,135,728 | 6/1964 | Monroe | 260/125 |
| 3,219,578 | 11/1965 | Cruickshank | 210/725 |
| 3,409,546 | 11/1968 | Mogelnicki | 210/728 |
| 3,433,312 | 3/1969 | Burdyn | 175/66 |
| 3,516,932 | 6/1970 | Hedrick | 210/727 |
| 3,637,031 | 1/1972 | Hull | 175/66 |
| 3,637,491 | 1/1972 | Hedrick | 210/734 |
| 3,642,619 | 2/1972 | Lo Sasso | 210/728 |
| 3,737,037 | 6/1973 | Bone | 210/734 |
| 3,853,616 | 12/1974 | Rundell | 127/48 |
| 3,956,119 | 5/1976 | Davitz | 210/729 |
| 4,026,794 | 5/1977 | Mauceri | 210/708 |
| 4,028,233 | 6/1977 | Quentin | 210/728 |
| 4,035,289 | 7/1977 | Guillerme | 210/724 |
| 4,043,904 | 8/1977 | Takeda | 210/694 |
| 4,053,401 | 10/1977 | Fukushima | 210/728 |
| 4,127,482 | 11/1978 | Watson | 210/727 |
| 4,130,674 | 12/1978 | Roberts | 427/331 |
| 4,174,278 | 11/1979 | Tramier et al. | 210/728 |
| 4,176,720 | 12/1979 | Wilson | 166/293 |
| 4,234,421 | 11/1980 | Dover | 210/728 |

FOREIGN PATENT DOCUMENTS

| | | | |
|---|---|---|---|
| 662102 | 4/1963 | Canada | 210/727 |
| 2739715 | 3/1978 | Fed. Rep. of Germany | 210/52 |

*Primary Examiner*—Peter A. Hruskoci
*Attorney, Agent, or Firm*—Berman, Aisenberg & Platt

[57] ABSTRACT

An admixture of waste (oil-well) drill cuttings, drilling fluid and by-products of rotary drilling are separated into good-quality water and high-density solids by chemical and mechanical means in original earthen-mud storage and/or reserve pits. The treatment produces two useful benefits: (1) good-quality water (useful for agriculture or for drilling a new well) is recovered, and (2) resulting concentrated solids are of such a high density that the land area occupied by and containing such dewatered solids can be immediately leveled and restored to the same use it had before the well was drilled. The effect is a reduction in energy of at least 75 to 85 percent over the present method of hauling whole mud off by trucks to a commercial waste-disposal site.

When environmental considerations do not require restoration of the site and reserve pits are allowed to weather to a point of collapse, this process reduces or eliminates surface pollution of nearby creaks, rivers and ponds by preventing release of drilling-fluid chemicals. It also effects a net reduction in energy by breaking the pollution chain. Moreover, less equipment and chemicals are required at any point in the cycle.

13 Claims, 1 Drawing Figure

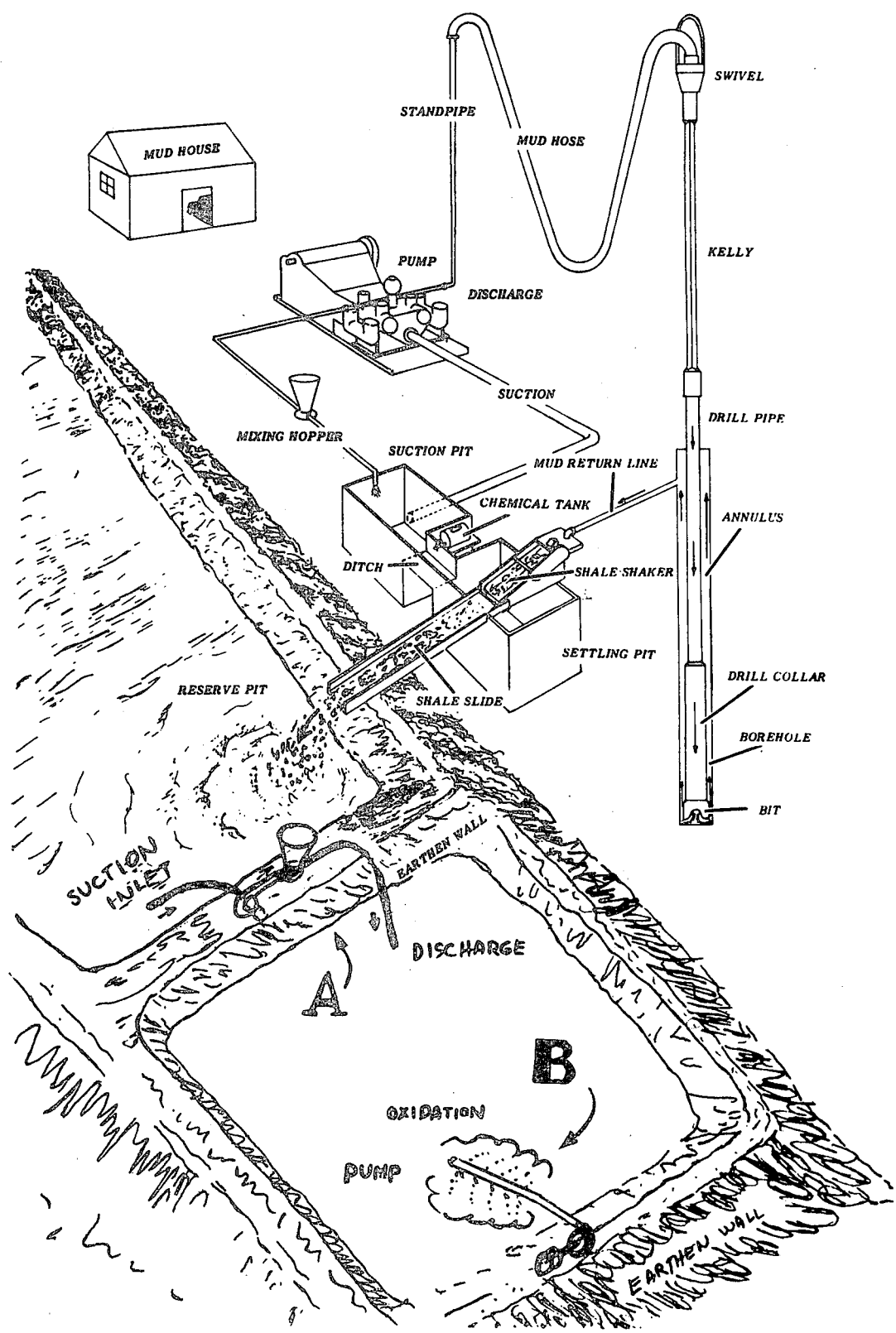

LAND RESTORATION FOLLOWING OIL-WELL DRILLING AND PRODUCTS USEFUL THEREFOR

RELATED APPLICATION

This application is a continuation-in-part of application Ser. No. 17,558 of Mar. 5, 1979 (U.S. Pat. No. 4,234,421), the entire disclosure of which is incorporated herein by reference.

FIELD OF INVENTION

A high expenditure of capital and energy is needed to satisfy environmental laws which require returning an oil drill site to its original condition by leveling reverse mud pits after drilling is completed. This invention is particularly concerned with saving energy, but also permits construction of smaller pits because the process is useful during well-drilling operations.

BACKGROUND

Oil-well drilling presents a unique industrial-waste-control and energy-saving problem because geologists and engineers must locate drilling rigs and related services as close as possible to where the oil or gas is believed to occur—not where it is convenient, as in the case of a plant site. Secondly, hundreds and usually thousands of feet of clay, sandstone or limestone rock must ordinarily be removed by the drill bit and circulating mud before personnel on a rig know whether they were successful. In deep wells, a carload of cuttings are brought to the surface every 8 hours.

Several thousand barrels of mud and chemicals are required to drill to target depth successfully. Once this task has been completed, all of the mud, cuttings, decomposed and altered organic and inorganic by-products and accumulated debris is on the surface in pits. Better methods than allowing such waste to remain in a pit or having trucks come in to haul it all off are needed. To Applicant's knowledge no better method was available prior to his invention.

According to an established and accepted method of drilling on land, drilled cuttings, waste mud and excess drilling fluid are stored in temporary earthen pits while the well is being drilled. The pits are typically constructed by having a bulldozer push up dikes prior to starting drilling operations. The pit is connected to a circulating system of the rig by pipe or ditches. (See FIGURE.)

Once drilling begins, circulation of enormous quantities of water is a necessary part of the drilling operation. Hand-in-hand with the water used to make a drilling mud is the subsequent generation of, literally, carloads of drill cuttings brought to the surface by the drilling mud. The spent mud and cuttings are deposited in the diked areas (reserve pits).

The earthen pits may cover an acre or more. In some deep wells or wells of large borehole diameter the waste pits (called reserve pits by many in the industry) may contain 50,000 to 100,000 barrels (bbl) of such spent drilling mud and cuttings.

In cases of limited available land for pits, the whole waste-mud slurry may be hauled off once or twice while the well is being drilled. This great expense seriously affects the efficiency of the whole drilling operation. These current practices are a source of wasted manpower, equipment and energy.

Therefore, those in the industry recognize that a method to improve this aspect of the drilling operation would be highly desirable. Based on this premise, a formulation of chemicals, procedures and equipment has been developed to allow recycle of a major part of the waste fluid; restoration of the land where a pit is located is thus greatly simplified.

The effect is a net reduction in energy use and a great reduction in potential adverse effects on the environment for years to come in the area around mud storage pits, as well as a reduction in damage to streams and ponds due to surface run-off.

Thus, after a well is drilled, and regardless of whether it produces commercial quantities of oil or gas, this invention permits restoration of the land by conventional earth movers so that the surface can once again be used for farming or as range land for animals.

Specifically this invention pertains to a new practical method of treating waste mud and drilled cuttings while still in temporary earthen pits by the use of formulated chemicals along with a specific procedure so that the water therein is substantially separated from solids. This permits recycling clarified water and restoring the land to the condition it was in prior to drilling the well.

PRIOR ART

A somewhat related problem encountered in mining phosphate rock is considered by Davidtz (U.S. Pat. No. 3,956,119), who discovered that the natural, extractable organic matter of fertile topsoil is a highly effective flocculating agent for phosphate slimes waste.

Hronas (U.S. Pat. No. 3,066,095) is concerned with clarifying potable and other industrially-useful water containing substances (usually non-settling silt which is colloidal in particle size, clay, plant life, bacteria and organic matter) which impart turbidity and objectionable color to the water. He clarifies with an inorganic coagulant, such as alum, a bentonitic clay and an organic polyelectrolyte, such as hydrolyzed water-soluble polyacrylamide having an average molecular weight of at least 10,000. He treats the type of water that is used to prepare fresh well-drilling fluid. That water is significantly different from used and spent drilling mud. Drilling-mud pits contain high-solids, strongly-alkaline water comprising chemical dispersants, such as ferrochrome lignosulfonates and lignite, which are not encountered in the clarification of rivers and lakes.

Green (U.S. Pat. No. 3,130,167) specifically alludes to the improvement of floc size and settling in hot phosphate softening processes. Treated suspensions normally contain solid materials in very finely divided form in concentrations within the range of about 0.001 to about 3 percent by weight, i.e. considerably lower than solids concentrations in drilling mud reserve pits. Green is not concerned with oil and grease removal, improving BOD and COD or concentrations of lignosulfonate and humate salts which are present in drilling mud reserve pits. Green contemplates coagulating compositions comprising a water-soluble polyelectrolyte resin and a coagulating clay. The resin can be sodium polyacrylate, and the coagulating composition can be effectively employed in conjunction with other coagulants, such as aluminum sulfate.

Like Green, Cruickshank (U.S. Pat. No. 3,219,578) refers to such wastes as phosphate mine wastes, coal washing water, clay suspensions, calcium carbonate suspensions and other suspensions of finely divided solids in water which result from industrial processes, such as mining, washing and purification. He treats aqueous suspensions with a polymer derived by condensing alkyl dihalides and polyalkylene polyamines.

Hedrick (U.S. Pat. No. 3,516,932) and Hedrick (U.S. Pat. No. 3,637,491) clarify water containing suspended matter by adding to such water synthetic water-soluble polyelectrolyte which is a linear polymer containing amide substituents.

Hull (U.S. Pat. No. 3,637,031) found that particular polyacrylamide homopolymer is effective as either a selective or nonselective flocculating agent to remove cutting fines from aqueous rotary drilling fluids.

Lo Sasso (U.S. Pat. No. 3,642,619) found that the dewatering of waste sludges is greatly enhanced by treating the sludge (prior to dewatering) with an admixture of a water-soluble high-molecular-weight nonionic polyacrylamide and a water-soluble salt containing ferric ions.

Quentin (U.S. Pat. No. 4,028,233) removes hydrocarbon or halogenated hydrocarbon contaminants dissolved in crude water (in concentrations below 10 mg/l) by mixing the water with one of specified polymers. Reference is made to polyacrylates and to aluminum sulfate.

Takeda (U.S. Pat. No. 4,043,904) is concerned with removing surface-active agents from waste water. He refers to a combination of aluminum sulfate at a concentration of from 50 to 1,000 parts per million with a concentration of from 1 to 10 parts per million of polyacrylic acid.

Fukushima (U.S. Pat. No. 4,053,401) relates to a sludge-disposal process for rendering non-poisonous and solidifying sludge and wastes containing poisonous pollutants by incorporating therein a sulfur compound or colloidal sulfur and a bituminous emulsion.

DISCLOSURE OF INVENTION

The invention has four interrelated aspects:

1. Flocculant—a combination of two flocculants, aluminum sulfate in a weight ratio of from about 24 to about 49 parts of aluminum sulfate per part of polyacrylate and a polyacrylate, either in liquid or dry-powder form.

2. An admixture of (a) flocculant (1) with (b) spent oil-well drilling mud (an aqueous mixture of waste drill cuttings, drilling fluid and by-products of rotary drilling), wherein the amount of (a) is sufficient to effect substantial water/solid separation of (b) within a few days.

3. A process for producing (2).

4. Restoring land after an oil-well drilling operation.

In the past, reserve pits were allowed to stand, "as is", until evaporation, storms or weathering gradually restored the land. In some cases, this took from 5 to 10 years in south Louisiana. The subject invention makes it possible to restore land to normal use within a few days after drilling has ceased and the rig removed.

If the reserve pit fills up before the well is complete, the waste mud can now be separated into useable clean water (at least sixty percent of the water in the aqueous mixture) and high-solids sludge. Only the sludge has to be hauled off to make room for more drill cuttings and waste mud.

By "usable clean water" (throughout the present disclosure and claims) is meant environmentally-acceptable water that may be discharged, e.g., into streams and which meets with such state-imposed "clear water" standards as:

| | |
|---|---|
| clarity (Jackson turbidity units) | <100 JTU |
| total suspended solids (mg/l) | <50 |
| pH | 6 to 9 |
| chemical oxygen demand (COD) (mg/l) | <150 |
| biological oxygen demand (BOD) (mg/l) | <50 |
| oil and grease (mg/l) | <15 |
| zinc (mg/l) | <5.0 |
| chromium (mg/l) | <0.5 |
| dissolved oxygen (ppm)>5.0 | |

By laboratory and field testing under actual well conditions, the flocculant (1) has been found to improve the following properties significantly:

(i) Solids separation—Totally flocculates all types of clays and shales as needed for separation of solids from the fluid;

(ii) Clarification—Removes all color bodies usually associated with drilling fluids containing dissolved lignosulfonate and lignite dispersants;

(iii) pH—The process does not cause an undesirable increase in pH since high alkalinity chemicals are not used; indeed, drilling muds usually have unnaturally high alkalinity that is unfavorable to the environment;

(iv) In addition, other properties of water:
 Biological oxygen demand (B.O.D.)
 Chemical oxygen demand (C.O.D.)
 Dissolved oxygen
 Clarity
 Oil and Grease
 Total dissolved solids
 Suspended solids
 Heavy metals
are restored to their more-natural state.

Neither aluminum sulfate nor a polyacrylate flocculant, used alone, is capable of performing effectively in all of these phases. The aluminum sulfate functions as a partial flocculant; it settles some solids, but other solids and contaminated color remain.

The polyacrylate polymer also functions as a partial flocculant; it flocculates certain types of solids and cleans others. However, by itself this polymer does not function either as a tottal flocculant or a total cleaning agent.

The combination of aluminum sulfate with the polyacrylate polymer flocculant in the stated ratio serves as a total flocculant and a total cleaning agent. These factors being accomplished, the other parameters—Total Solids Content, COD and BOD are substantially changed. With all chemicals removed, the Chemical Oxygen Demand is lowered to reasonable levels, while the Biological Oxygen Demand can be decreased by mechanical oxidation.

The subject combination flocculant has several readily-apparent major advantages:

a. Environmental—cleans up dirty, contaminated water in the reserve pit so that it can be safely used for other wells or for agricultural purposes;

b. Energy saving—cleaned up water can be removed from the pit and hauled off with fewer tank trucks; the energy required to remove the whole mud from the pit is reduced by as much as 75 to 85 percent.

BRIEF DESCRIPTION OF DRAWINGS

The sole FIGURE is a plan view of components of a fluid circulation system.

DETAILS

Although not so limited, the invention is extraordinarily manifested in clarification of drilling muds that contain from 0.25 to 14 lb/bbl of drilling-fluid grade lignosulfonate and/or from 0.25 to 20 lb/bbl of alkaline-soluble lignite. These products are strong, anionic colloids that are unique and essential to most drilling muds as dispersants and filter flow additives. Their presence seriously interferes with the practice of other methods of water clarification. These materials, the subject combination-flocculant composition and method of treatment have a special interdependence which is responsible for the unique manner, marked extent and practical success in the clarification of drilling muds containing such lignosulfonate and/or lignite.

Examples of lignosulfonates are ferrochrome lignosulfonates, such as Q-Broxin from NL Baroid; chrome Lignosulfonate, such as Spersene from Dresser Magcobar; and a variety of blended products, such as calcium, sodium and iron lignosulfonates.

Any lignite with an alkaline solubility of from 20 to 100 percent by weight is useful in drilling muds.

To form the combination-flocculant composition, from 96 to 98 parts by weight of aluminum sulfate are admixed with from 4 to 2 parts by weight, respectively, of polyacrylate flocculant. The combination of 97 parts by weight of aluminum sulfate and 3 parts by weight of polyacrylate flocculant functions most effectively. A particularly good polyacrylate flocculant is a polyacrylamide homopolymer in which the ratio of pendant amide groups to pendant carboxylic acid or carboxylic acid salt groups is between 130 and 500, such as those referred to in U.S. Pat. No. 3,637,031.

The molecular weight of the polyacrylate flocculant is from about 10,000 to 5 million. The range from about 10,000 to 400,000 is suitable, but that between 1 million and 5 million is preferred. The particular polyacrylate flocculant employed is somewhat limited. For example, the sodium polyacrylate known and sold as WL-100 fails to satisfy the prerequisites for this invention. Many polyacrylate flocculants are known. Those which are regarded as useful within the context of this invention are those which are effective, when combined with aluminum sulfate (in a ratio of from 24 to 49 parts by weight of aluminum sulfate per part by weight of polyacrylate flocculant), to separate within several days as "clear water" at least sixty percent of the water in aqueous waste drilling-fluid reserve-pit mixtures containing an anionic colloid, such as drilling-fluid grade lignosulfonate and alkaline-soluble lignite.

With reference to the drawing, which shows how the invention is used on a rig during drilling operations, A is the location of, e.g., a 4-inch centrifugal pump and hopper. The discharge of the pump can be flipped to either pit; it can work out of one or both pits and has an approximate pump output of from 12 to 15 barrels (bbl) per minute (min.). It is used to mix the combination-flocculant composition with spent drilling mud in, e.g., the reserve pit according to the degree of basic contamination of the water or mud before treatment.

B is the location of, e.g., a 2-inch oxidation pump having an approximate pump output of from 2 to 4 bbl/min. This pump can be disconnected and used to recycle clean water as needed to a rig or to land for irrigation.

Aeration is effected by introducing oxygen into the waste water or mud. Pump B initiates a spraying action by pumping water or mud through a pipe with several jets. Aeration is also accomplished by leaving the discharge hose from pump A out of water.

As already noted, the rate of mixing the combination-flocculant composition with spent drilling mud is dependent upon the degree of contamination:

severe: 6 to 10 sacks (300 to 500 pounds) per hour
moderate: 4 to 6 sacks (200 to 300 pounds) per hour
light: 2 to 4 sacks (100 to 200 pounds) per hour The noted degrees of contamination are more accurately defined in following Table I:

TABLE I

| Parameter | DEGREES OF CONTAMINATION | | |
|---|---|---|---|
| | Light | Moderate | Severe |
| Suspended solids (mg/l) | up to 1000 | 1000 to 4000 | more than 4000 |
| Dissolved solids (mg/l) | up to 4000 | 4000 to 10,000 | more than 10,000 |
| COD (mg/l) | up to 500 | 500 to 4000 | more than 4000 |
| BOD (mg/l) | up to 250 | 250 to 1000 | more than 1000 |
| pH | 6 to 8 | 8 to 9 | more than 9 |
| $O_2$ | 3 to 5 | 1 to 3 | less than 1 |
| Clarity (JTU)* | up to 100 | 100 to 500 | more than 500 |
| Oil and grease (mg/l) | up to 25 | 25 to 1000 | more than 1000 |

*Jackson Turbidity Units

Generally, one 50-pound sack of the combination-flocculant composition will effectively treat 100 barrels (0.5 pound per barrel) of the most contaminated (colorwise) water and will reclaim from 80 to 90 percent of the original volume for reuse, recycling or return to nature.

Drilling muds are complex mixtures of organic and inorganic chemicals and minerals. Conventional water-testing methods are unsatisfactory because of (1) filter plugging due to colloidal filter loss additives or (2) the inability of ordinary flocculants to drop out colloidal clays of the smectite class.

The combination-flocculant composition and the instant procedure do an excellent job on drilling muds. A typical bottle test on an actual drilling mud taken from a waste-mud reserve pit is shown in Table II. Note that Sample 13 showed good solids dropping properties and represents an example of this invention.

The testing described in this table was conducted at a well-site from Mar. 6 through Mar. 16, 1978.

TABLE II

Clarification Bottle Tests on a Waste Drilling Mud from Southern Louisiana

| Flocculants (bottle tested) | Results |
|---|---|
| (1) Floconic (Pal Mix) | unsatisfactory |
| (2) Floconic + Alum | satisfactory only at high concentration |
| (3) Drilaid 421 Liquid (Amoco) | unsatisfactory |
| (4) Drilaid 421 + Alum | unsatisfactory - some flocculants |
| (5) MEP 491 (Magna) (cost prohibitive) | unsatisfactory - some flocculants |
| (6) MEP 491 + Alum (cost prohibitive) | unsatisfactory - some flocculants |
| (7) Drilaid 483 (Amoco) | unsatisfactory |
| (8) Drilaid 483 + Alum | unsatisfactory |
| (9) Drilaid 482 (Amoco) | unsatisfactory |
| (10) Drilaid 421 (Powdered) (Amoco) | unsatisfactory - immediate flocculants |
| (11) Aluminum Sulfate | unsatisfactory - immediate flocculants |
| (12) MF-1 (Rotary) | unsatisfactory |
| (13) MF-1* + Alum | best - |

TABLE II-continued
Clarification Bottle Tests on a Waste
Drilling Mud from Southern Louisiana

| Flocculants (bottle tested) | Results |
|---|---|
| | immediate flocculation w/clear water |
| (14) Lime | no change |
| (15) Lime + Alum | no change |
| (16) Lime + Alum + MF-1 | no improvement over #13 |

*polyacrylate flocculant of U.S. Pat. No. 3,637,031

In one well in South Louisiana treatment of a reserve pit by this process reduced B.O.D. from 612 to 42 mg/l. The C.O.D. was reduced from 17,026 to 297 mg/l. Overall water quality was greatly improved, as can be seen from Table III.

TABLE III

| | Sample A After | Sample B Before |
|---|---|---|
| B.O.D. - 5 day - mg/l | 42 | 612 |
| C.O.D. - mg/l | 297 | 17,026 |
| pH | 4.10 | 7.55 |
| Dissolved Oxygen - mg/l | 6.0 | 1.0 |
| Clarity | Clear | Opaque |
| Oil and Grease - mg/l | 1 | 533 |
| Total Dissolved Solids - mg/l | 341 | 383 |
| Suspended Solids - mg/l | 12 | 2,148 |

The economics of this invention are more-fully appreciated by the following considerations:

| (a) 100-barrel vacuum trucks | cost - $34.00 per hour |
|---|---|
| Disposal pit - 3 hours away | 6 hours at $34.00 per hour |
| Disposal fee | $1.00 per barrel |
| Total cost | $3.04 per barrel |
| This is based on an assumption that vacuum trucks are available, and a disposal pit is available and nearby. | |
| (b) Drilling a disposal well (based on a 6000-foot well with injection zones available) plus costs to pump away | $50,000 |

13,158 barrels have to be pumped into the well to reduce disposal cost to $3.04 per barrel.

(c) Injecting down—outside production casing string of presently-producing well; operator runs risk of freezing up production due to differences of temperature between types of fluids—water down outside annulus, gas and oil up inside tubing.

(d) Injecting down—outside intermediate casing string of presently-drilling well. This can be most economical if the pressure requirements and regulations of proposed well do not require a total cement job behind the pipe (cemented to surface).

(e) Treating with chemical combination-flocculant composition of this invention. Estimated cost per barrel based on 50 pounds of formulated blend per 100 barrels of water—at present production costs $0.20 to $0.30 per barrel.

(f) For disposal well in (b) 170,000 to 250,000 barrels would have to be pumped down to equal the cost per barrel of (e).

An existing operation in which this invention is employed is especially designed for cleaning up rig reserve pits where other alternatives—hauling off or drilling a disposal well—would be more expensive. The system comprises a combination of flocculant treatment, which successfully removes all solids and color from chemicals, such as lignite and lignosufonate, and a special mechanical system.

It offers the following advantages:

(1) More economical—cost per barrel of treated water is less than 25 cents/bbl, as compared to other alternatives;

(2) Time—60,000 to 80,000 barrels are treated in a matter of days;

(3) Requires no heavy equipment—the largest equipment necessary is a 4"-centrifugal pump and access to unload chemicals;

(4) Water, after treating, can be recycled and reused or pumped off for irrigation purposes as desired;

(5) Clarity, solids content, oil content, pH, and oxygen properties can be treated as desired; and (6) The effects of the system are non-polluting and non-toxic; it substantially reclaims all of liquid phase for reuse.

This invention is useful for cleaning out a reserve pit while a well is being drilled when the capacity of the pit is exceeded before the well is complete.

It is also useful (when the well drilling operation has been completed) to separate suspended solids from the water medium.

Application of this invention at well locations has shown a reduction in energy of from 75 to 85 percent over the present method of hauling whole mud away.

Using this process to restore land after a drilling operation is completed will protect the environment and allow the acreage involved to be returned to the same use it was used for prior to the drilling operation.

The invention and its advantages are readily appreciated from the preceding description. It is apparent that various changes may be made in the process and in the compositions without departing from the spirit and scope of the invention or sacrificing its material advantages. The process and compositions described herein are merely illustrative of preferred embodiments of the invention.

EXEMPLIFICATION

General Procedure for Treating Reserve Pits and Up-Grading Water Quality

1. Inspect Location
 (a) Check area around the pits for safety and accessibility of personnel and equipment;
 (b) Obtain samples of fluid from different locations around each pit; select and test fluid samples in order to determine severity of contamination, such as oil and grease and suspended drilling-fluid-solids content;
 (c) Pilot test with flocculant; select starting mixing rate.
2. Rig up Suction Hose and Aeration Equipment
 (a) Typical requirements for treating section:
 4-inch pump, e.g. diesel centrifugal pump
 Suction hose (50 to 75 feet)
 Connection hose (20 to 30 feet)
 Discharge hose (50 to 75 feet)
 4-inch (outlet) hopper with a feed opening of about 2 feet square
 (b) Typical Requirements for Aeration System:
 2-inch pump
 Suction house (20 to 30 feet)
 Connection hose (20 to 30 feet)
 Aerator 3. Start Circulating Pumps; mix in treating chemicals at a rate dictated by pilot tests in step 1(c); note when break-over to clarified mud is complete; be sure aeration system is running concurrently with treatment of reserve pit.

4. Periodically test treated water; continue treatment until it meets discharge specifications.

5. Have water inspected by proper regulatory agency; obtain permit or approval for discharge.

6. Discharge or transport water.

7. Move in equipment to backfill reserve pit and restore service consistent with the local terrain.

General Guidelines

1. Mixing Pump—The smallest pump recommended is a 4-inch pump with three cylinders capable of putting out from 40 to 50 psia working pressure with a pump rate of from 12 to 15 barrels per minute; larger-sized pumps are naturally similarly useful with corresponding changes in dimensions of the circulating system.

2. Hopper—For a 4-inch pump, a hopper with a 1.5-inch jet is preferred for proper shearing action; with larger pumps, the jet size should be adjusted accordingly.

3. Aerator System—A 2-inch pump capable of putting out from 10 to 20 psia working pressure and connected to a 1-inch pipe (approximately 4 feet long) with 0.125-inch jets spaced every 4 inches (with closed ends of pipe) is suitable; the pipe should be welded across two barrels for flotation purposes. A pump rate of from 2 to 4 barrels per minute is preferred; a larger, e.g. 2-inch, pipe will also work.

4. In general, the flocculation is noticeable within from 48 to 72 hours after initiation of adding chemicals; for example, a 40,000-barrel pit should be completely flocculated within four days (assuming equipment is operating over a period of 12 hours per day).

5. After meeting specifications, water is discharged or recycled, as desired, leaving approximately from 20 to 25 percent of original volume on the bottom as sludge, which can be disposed of or backfilled.

There are actually three stages in the subject treatment. During the first stage spent mud (e.g. 40,000 barrels) is in a reverse pit; the actual nature of the spent mud will dictate the amount of chemicals to be added thereto during flocculation. The second stage is a combined flocculation and aeration stage. During this stage about 0.5 pound of flocculant is added to the spent mud in the reverse pit per barrel of spent mud; the flocculant is added to a hopper connected to a 4-inch pump, through which the spent mud is pumped and returned back to the reserve pit; the pump operates at about 40 psia working pressure and processes from 12 to 15 barrels per minute of mud; from 6 to 10 sacks (50 pounds each) of flocculant are introduced into the pump hopper per hour; flocculant is added in this manner for 12 hours per day over a four-day period.

Concurrently with the addition of flocculant, aeration is effected by the use of a 2-inch electric pump which has a working pressure of from 10 to 15 psia; such pump is used to spray from 2 to 4 barrels per minute of spent mud into the air as the spent mud is being flocculated. The third stage involves disposal of the purified water and settled sludge and backfilling the area occupied by the reserve pit.

Actual Data

From a well in Acadia Parish, Louisiana, approximately 60,000 barrels of spent drilling mud were collected in a reserve pit. This spent drilling mud was treated over a period of six days (12 hours per day) with 10 sacks (50 pounds each) of the flocculant per hour with concurrent aeration. The water properties before and after such treatment are reflected in the following table:

TABLE IV

| Water Properties | Before | After |
| --- | --- | --- |
| pH | 9.9 | 6.26 |
| Clarity (JTU's) | 8,200 (dark brown mud) | 240 (clear, light amber) |
| BOD, mg/l | 134 | 74 |
| COD, mg/l | 6,355 | 727 |
| Dissolved O$_2$, mg/l | 0.9 | 9.8 |
| Oil & Grease | 1 | 1 |
| Suspended Solids, mg/l | 4,213 | 120 |
| Dissolved Solids, mg/l | 16,440 | 5,232 |
| Chlorides, mg/l | 600 | 1,300 |
| Chromium, mg/l | 127.2 | 0.62 |

About 30,000 barrels of spent drilling mud obtained from a well in Vermilion Parish, Louisiana, were collected in a reserve pit and treated according to the previously-described procedure for three days (12 hours per day) with from 8 to 9 sacks of flocculant per hour and concurrent aeration. The water properties are reflected in the following table:

TABLE V

| Water Properties | Before | After |
| --- | --- | --- |
| pH | 8.6 | 6.0 |
| Clarity (JTU's) | 710 | 50 |
| BOD, mg/l | 95 | 12 |
| COD, mg/l | 3,280 | 80 |
| Dissolved O$_2$, mg/l | 4.2 | 8.7 |
| Suspended Solids, mg/l | 1,233 | 17 |
| Dissolved Solids, mg/l | 13,530 | 3,180 |
| Oil & Grease, mg/l | 29 | 0.2 |

About 90,000 barrels of spent mud were collected in a reserve pit from a well in Rankin County, Mississippi. This spent mud was treated (6 sacks of flocculant per hour for 12 hours each day) for seven days with concurrent aeration. The water properties before and after such treatment are reflected in the following table:

TABLE VI

| Water Properties | Before | After |
| --- | --- | --- |
| pH | 7.37 | 6.05 |
| Clarity (JTU's) | 600 | 26 |
| COD, mg/l | 869 | 383 |
| Dissolved O$_2$, mg/l | 1 | 10 |
| Suspended Solids, mg/l | 1,370 | 4 |
| Oil & Grease, mg/l | 19 | 14 |
| Chlorides, mg/l | 95 | 95 |

About 70,000 barrels of spent drilling mud were collected in a reserve pit from a well in Pointe Coupee Parish, Louisiana, and similarly treated according to this invention. Treatment was effected for seven days (12 hours per day) by introducing into the spent mud from 6 to 7 sacks of flocculant per hour with concurrent aeration. The water properties before and after such treatment are reflected in the following table:

TABLE VII

| Water Properties | Before | After |
| --- | --- | --- |
| pH | 7.76 | 6.06 |
| Clarity (JTU's) | 300 | 20 |
| BOD, mg/l | 48 | 28 |
| COD, mg/l | 497 | 117 |
| Dissolved $O_2$, mg/l | 4.0 | 9.2 |
| Suspended Solids, mg/l | 250 | 19 |
| Oil & Grease, mg/l | 7 | 3 |
| Chlorides, mg/l | 100 | 113 |
| Dissolved Solids, mg/l | 1,300 | 1,182 |

In each of the preceding examples the flocculant was an admixture of 96 parts by weight of aluminum sulfate with 4 parts by weight of polyacrylate. The polyacrylate was that previously referred to as MF-1 in Table II.

The invention and its advantages are readily understood from the preceding description. Various changes (e.g. flocculation and aeration are optionally conducted concurrently in a single pit, rather than in separate pits as depicted in the drawing) may be made in the process, in the compositions and in the polyacrylate flocculant without departing from the spirit and scope of the invention or sacrificing its material advantages. The process and flocculants hereinbefore described are merely illustrative of preferred embodiments of the invention.

What is claimed is:

1. A flocculant useful for waste drilling-fluid reserve pit treating wherein the reserve pit contains an aqueous spent oil-well drilling mud including an anionic colloid selected from the group consisting of drilling-fluid grade lignosulfonate and alkaline-soluble lignite, the flocculant consisting essentially of from 24 to 49 parts by weight of aluminum sulfate per part by weight of polyacrylamide homopolymer having from 130 to 500 pendant amide groups per pendant carboxylic-acid or carboxylic-acid-salt group and having a molecular weight in the range of from 10,000 to 5 million.

2. A flocculant according to claim 1 wherein the molecular weight is within the range of from 10,000 to 400,000.

3. A flocculant according to claim 1 wherein the molecular weight is within the range of from one million to five million.

4. A flocculant according to claim 3 having 3 parts by weight of the polyacrylate polymer per 97 parts by weight of aluminum sulfate.

5. A flocculant according to claim 1 substantially free from water.

6. A flocculant according to claim 1 in powder form.

7. A process of separating, into good-quality water and high-density solids, an admixture of waste drill cuttings, drilling fluid and by-products of rotary drilling which comprises combining an effective amount of flocculant according to claim 1 with the admixture, flocculating solids in the admixture and separating water from the flocculated solids.

8. A process according to claim 7 wherein the amount of flocculant is sufficient to effect substantial water/solid separation within a few days.

9. A process according to claim 7 wherein the drilling fluid contains from 0.25 to 14 pounds per barrel of drilling-fluid grade lignosulfonate.

10. A process according to claim 7 wherein the drilling fluid contains from 0.25 to 20 pounds per barrel of alkaline-soluble lignite.

11. A process according to claim 7 which comprises mixing the flocculant with the admixture at a rate of about 30 to 50 pounds of flocculant per 100 barrels of said admixture.

12. A process according to claim 7 which comprises mixing the flocculant with the admixture at a rate of 20 to 30 pounds of flocculant per 100 barrels of said admixture.

13. A process according to claim 7 which comprises mixing the flocculant with the admixture at a rate of 10 to 20 pounds of flocculant per 100 barrels of said admixture.

* * * * *